United States Patent [19]

Guerci et al.

[11] Patent Number: 5,146,229

[45] Date of Patent: Sep. 8, 1992

[54] CONSTRAINED OPTIMUM MATCHED ILLUMINATION-RECEPTION RADAR

[75] Inventors: Joseph R. Guerci, Astoria; Robert W. Schutz, Lindenhurst; John D. Hulsmann, Miller Place, all of N.Y.

[73] Assignee: Grumman Aerospace Corporation, Bethpage, N.Y.

[21] Appl. No.: 720,671

[22] Filed: Jun. 25, 1991

[51] Int. Cl.$^5$ ............................................. G01S 13/28
[52] U.S. Cl. ..................... 342/204; 342/132
[58] Field of Search ............... 342/204, 132, 192, 82, 342/83

[56] References Cited

U.S. PATENT DOCUMENTS

| | | | |
|---|---|---|---|
| 3,216,013 | 11/1965 | Thor | 342/132 |
| 3,614,719 | 10/1971 | Treacy | 342/82 |
| 4,580,139 | 4/1986 | Weathers et al. | 342/132 |
| 4,626,853 | 12/1986 | Lee et al. | 342/132 |
| 4,901,082 | 2/1990 | Schreiber et al. | 342/192 X |
| 4,992,797 | 2/1991 | Gjessing et al. | 342/192 |

Primary Examiner—Gilberto Barrón, Jr.
Attorney, Agent, or Firm—Bacon & Thomas

[57] ABSTRACT

A pulse compression modified OMIR waveform $\bar{s}_N(t)$ is obtained by computing the OMIR eigenfunctions $\phi_i$, $i=1, 2, \ldots, \infty$, for an autocorrelation function of the expected target impulse response, specifying a waveform $c(t)$ having a desired pulse compression characteristic, and generating expansion terms $$\bar{s}_N(t) = \sum_{i=1}^{N} c_i \phi_i(t)$$

for various expansion indices N, until a desired waveform is obtained. The expansion coefficients $c_i(t)$ are given by $$c_i = \int_0^T c(t) \phi_i^*(t) dt.$$

6 Claims, 4 Drawing Sheets

CONSTRAINED OPTIMUM MATCHED ILLUMINATION-RECEPTION RADAR

BACKGROUND OF THE INVENTION

1. Field of the Invention

The present invention relates generally to radar detection of targets, and more particularly to improvement in the "pulse compression" characteristics of optimum matched illumination-reception (OMIR) radar waveforms. The invention also addresses the more general problem of providing a mechanism for "gradually" switching between strictly OMIR radar waveforms and radar waveforms other than OMIR radar waveforms.

2. Description of the Related Art

It has previously been proposed to maximize the signal-to-noise ratio in OMIR waveforms by generating solutions to an eigensystem equation associated with the expected autocorrelation function for an impulse response of a target, and by subsequently choosing the solution which maximizes the echo energy while satisfying other system constraints. The autocorrelation function is obtained using a computer-aided design system model of the target, based upon known geometrical data and applying appropriate radar cross-section codes incorporating such parameters as additional scattering characteristics, bandwidth limitations, expected aspect angle variation, and inhomogeneous radar-absorbing codings. This type of system is described in U.S. patent application Ser. No. 643,140, filed Jan. 17, 1991, and in U.S. patent application Ser. No. 717,058, filed Jun. 18, 1991.

The waveforms s(t) generated by the above system have the form $$s(t) = \mu \int_0^T s(\tau)\gamma(t,\tau)d\tau, \tag{1}$$

where $\mu$ is an eigenvalue of the integral equation, $\tau$ is a dummy variable of integration representing the time over which s(t) interacts with the target, T is the arbitrary duration of the transmitted pulse, $\gamma(t,\tau)$ is the kernel of the autocorrelation function and is given by $$\gamma(t,\tau) = \int_{T_i}^{T_f} h_1(\lambda - t)h_1^*(\lambda - \tau)d\lambda, \tag{2}$$

$h_1(t)$ is the impulse response of the target, and $T_i \to T_f$ is an arbitrary observation interval.

Despite the obvious advantages of this previously disclosed OMIR radar system, however, its practicality is limited because the "pulse compression" of the resulting OMIR radar waveforms was not accounted for in the initial set of boundary value conditions used to define the problem addressed by the system. Poor pulse compression results in poor range resolution and/or poor temporal side lobe levels, which all but precludes their application to radar detection scenarios in which either significant clutter is present, or in which greater range resolution is required.

SUMMARY OF THE INVENTION

It is an objective of the invention to solve the problem of poor "pulse compression" inherent in the above-described radar echo signal-to-noise maximization system.

This objective is achieved by transmitting a modified OMIR waveform s(t) of the form $$\overline{s}_N(t) = \sum_{i=1}^N c_i\phi_i(t) \tag{3}$$

where $\phi_i(t)$, $i=1, 2, \ldots, \infty$ are the eigenfunctions associated with the OMIR integral equation (Equation 2). The associated eigenvalues are $\lambda_1, \lambda_2 \ldots, \lambda_\infty$, where $\lambda_i = 1/\mu_i$, $\lambda_1 \geq \lambda_2 \geq \lambda_3 \ldots$, and where the expansion coefficients $c_i$ are given by the formula $$c_i = \int_0^T c(t)\phi_i^*(t)dt, \tag{4}$$

c(t) being any waveform of duration T which has the desired pulse compression characteristics.

In a preferred embodiment of the invention, design parameter N is chosen so as to, on the one hand, be as small as possible, while on the other hand simultaneously satisfying requisite pulse compression properties. Thus, the invention gives a mechanism for gradually modifying the transmitted waveform $\overline{s}_N(t)$ between two generally competing design characteristics, the maximum output signal-to-noise ratio, and the pulse compression of the transmitted waveform.

DETAILED DESCRIPTION OF THE PREFERRED EMBODIMENT

In accordance with a preferred embodiment of the invention, a modified OMIR waveform given by the Nth term of an expansion is generated by taking the inner product of the set of eigenfunctions $\phi_i(t)$ ($i=1,2,\ldots,\infty$) associated with the OMIR integral equation, Equation 2 as set forth above, and the expansion coefficients $c_i$ ($i=1,2,\ldots,N$) of a waveform c(t) having desired pulse compression characteristics.

The modified waveform is given by the formula $$\overline{s}_N(t) = \sum_{i=1}^N c_i\phi_i(t) \tag{5}$$

where expansion coefficients $c_i$ are given by the formula $$c_i = \int_0^T c(t)\phi_i^*(t)dt \tag{6}$$

and where eigenfunctions $\phi_i$ are associated with eigenvalues $\lambda_1, \lambda_2, \ldots, \lambda_\infty$, where $\lambda_i = 1/\mu_i$, and $\lambda_1 \geq \lambda_2 \geq \lambda_3 \ldots$.

Because the OMIR integral function $\gamma(t,\tau)$ (Equation 2) is in general hermitian and positive definite, the eigenfunctions $\phi_i(t)$ will form a complete orthonormal basis on the time interval [0, T]. Therefore, $$\lim_{N \to \infty} \| \tilde{S}_N(t) - C(t) \|_{L^2} = 0. \tag{7}$$

This permits one to gradually modify the transmitted waveform between two generally competing design characteristics, the maximum output SNR and pulse compression. When $N=1$, the modified waveform $\tilde{S}_N(t)$ matches the optimum OMIR waveform s(t) given by Equation 1, while as N approaches infinity, the range of $\tilde{S}_N(t)$ approximates the range of the desired waveform c(t) having the desired pulse compression characteristics. Consequently, according to the preferred embodiment, $\tilde{S}_N$ is found by increasing N until a maximum until a maximum value is reached which still gives an acceptable signal-to-noise ratio.

EXAMPLE

Figure 1:
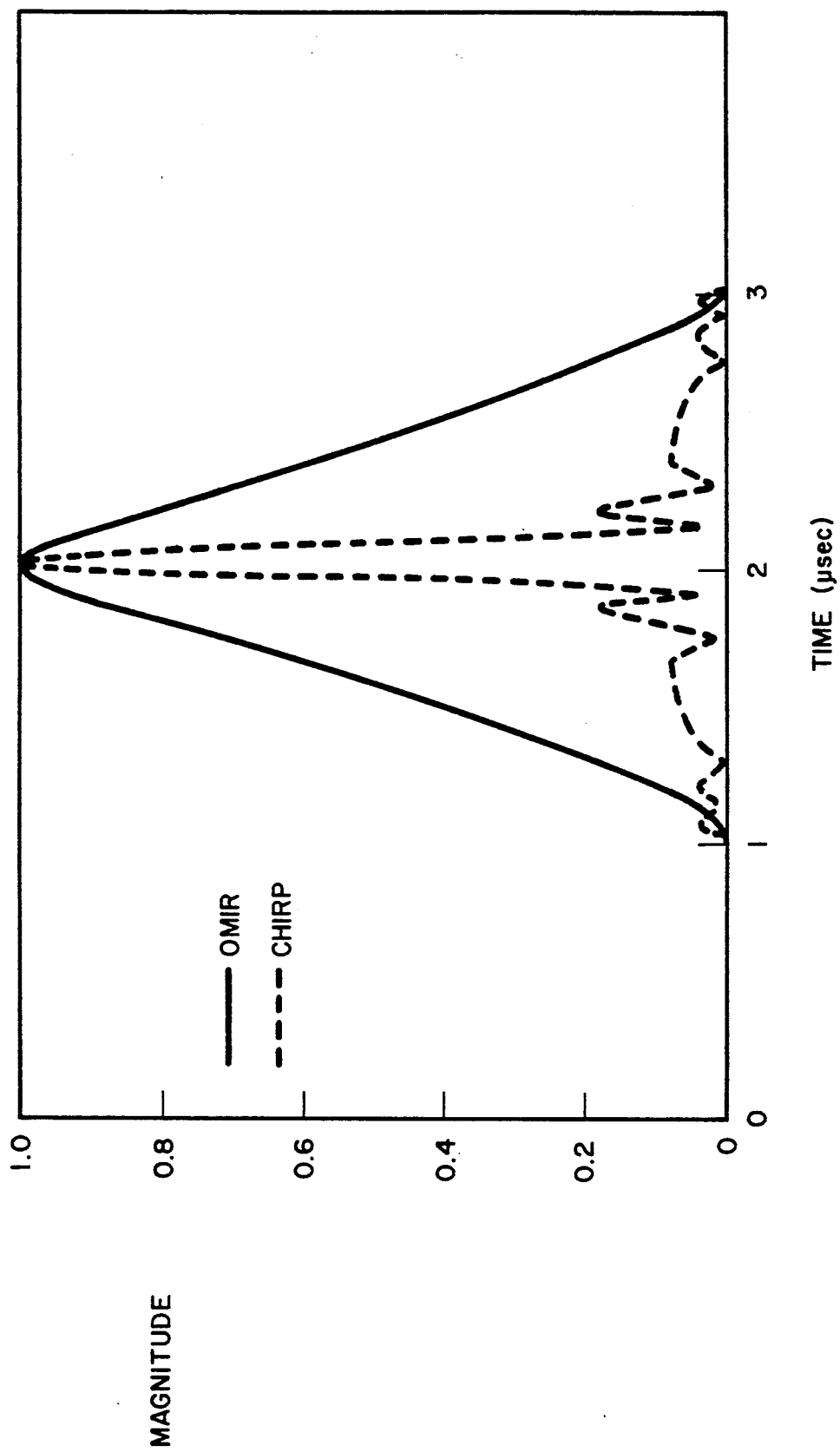
FIG. 1 shows an output waveform from a matched filter for expansion index N=1.

FIG. 1 shows an exemplary OMIR waveform based upon the amplitude spectra of the Fourier transform of a model target impluse response, in accordance with the principles described in U.S. patent application Ser. Nos. 643,140 and 717,058, described above. The waveform of FIG. 1 is received through an ideal 420-430 MHz bandpass filter which has a range resolution about ten times larger than a corresponding "chirp" pulse compression waveform of duration one microsecond with a frequency deviation $\Delta f = 10$ MHz. The form of the waveform is given by Equation (1), and thus its signal-to-noise ratio is maximized, but the range resolution is too poor for the waveform to be used in practice. This waveform corresponds to the waveform of Equation (3) with an expansion index of $N=1$.

Figure 2:
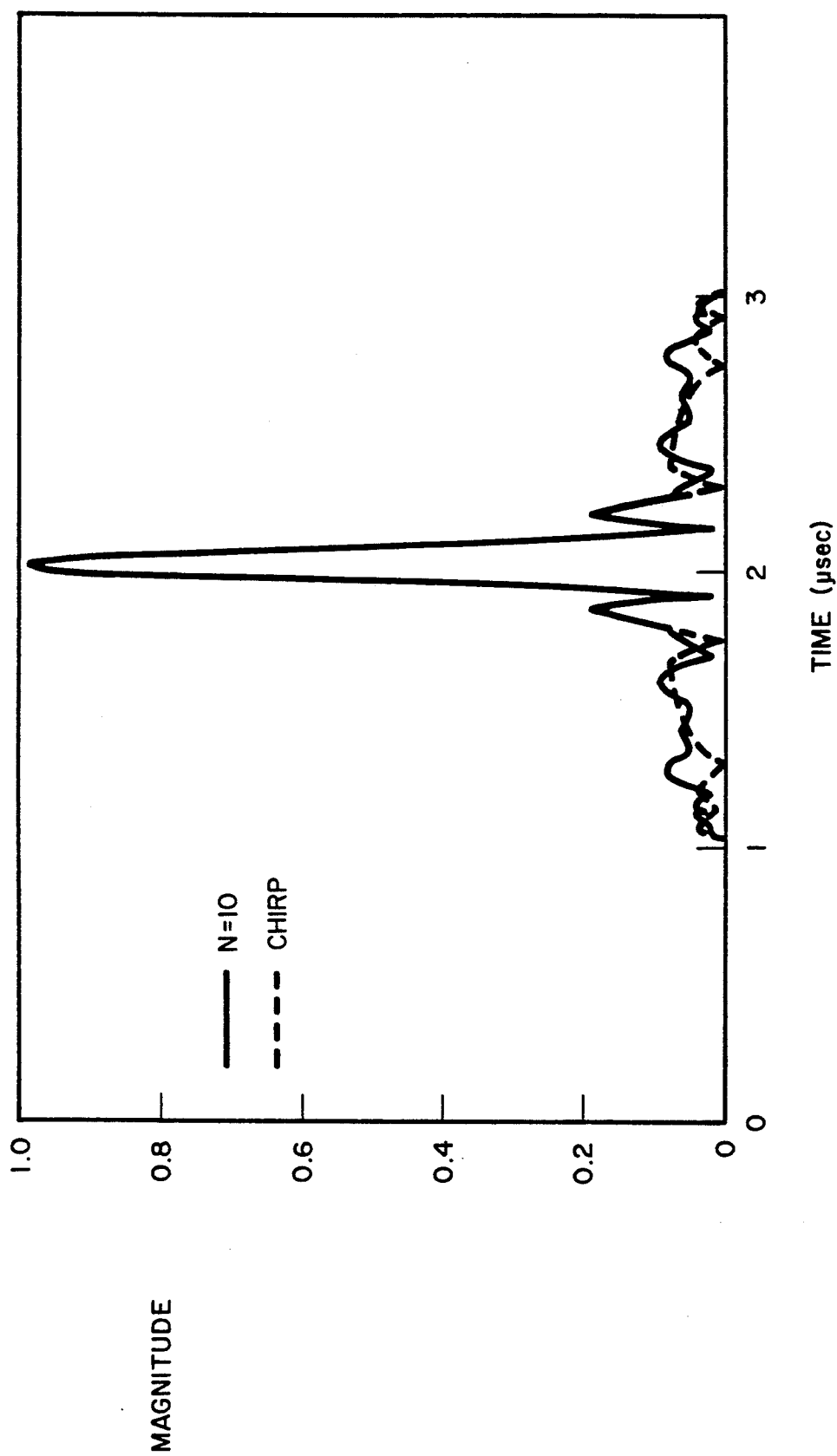
FIG. 2 shows the output of the matched filter for expansion index N=10, with c(t) chosen to be the chirp waveform according to a preferred embodiment of the invention.
Figure 3:
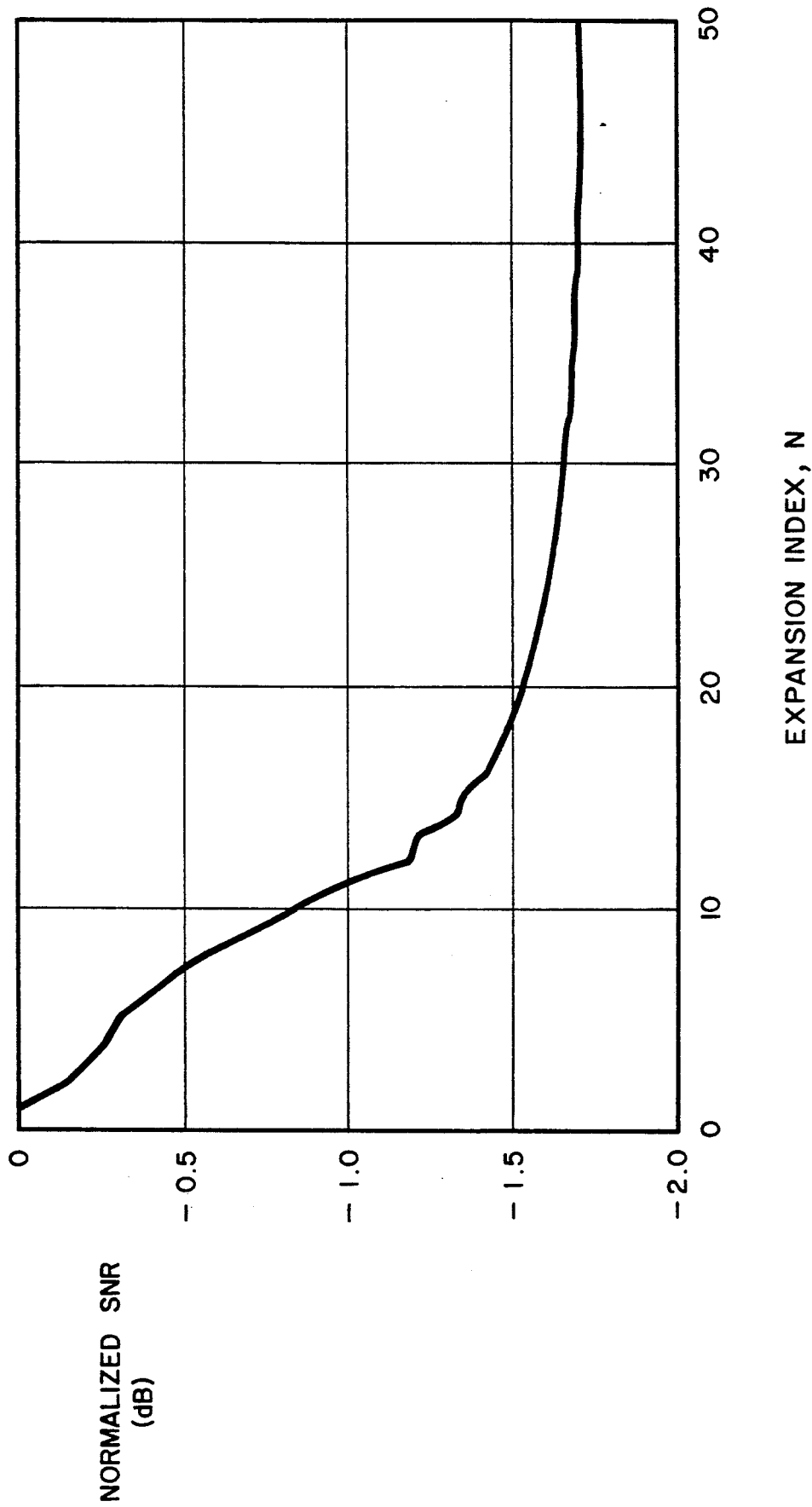
FIG. 3 shows an output signal-to-noise ratio as a function of the expansion index N.
Figure 4:
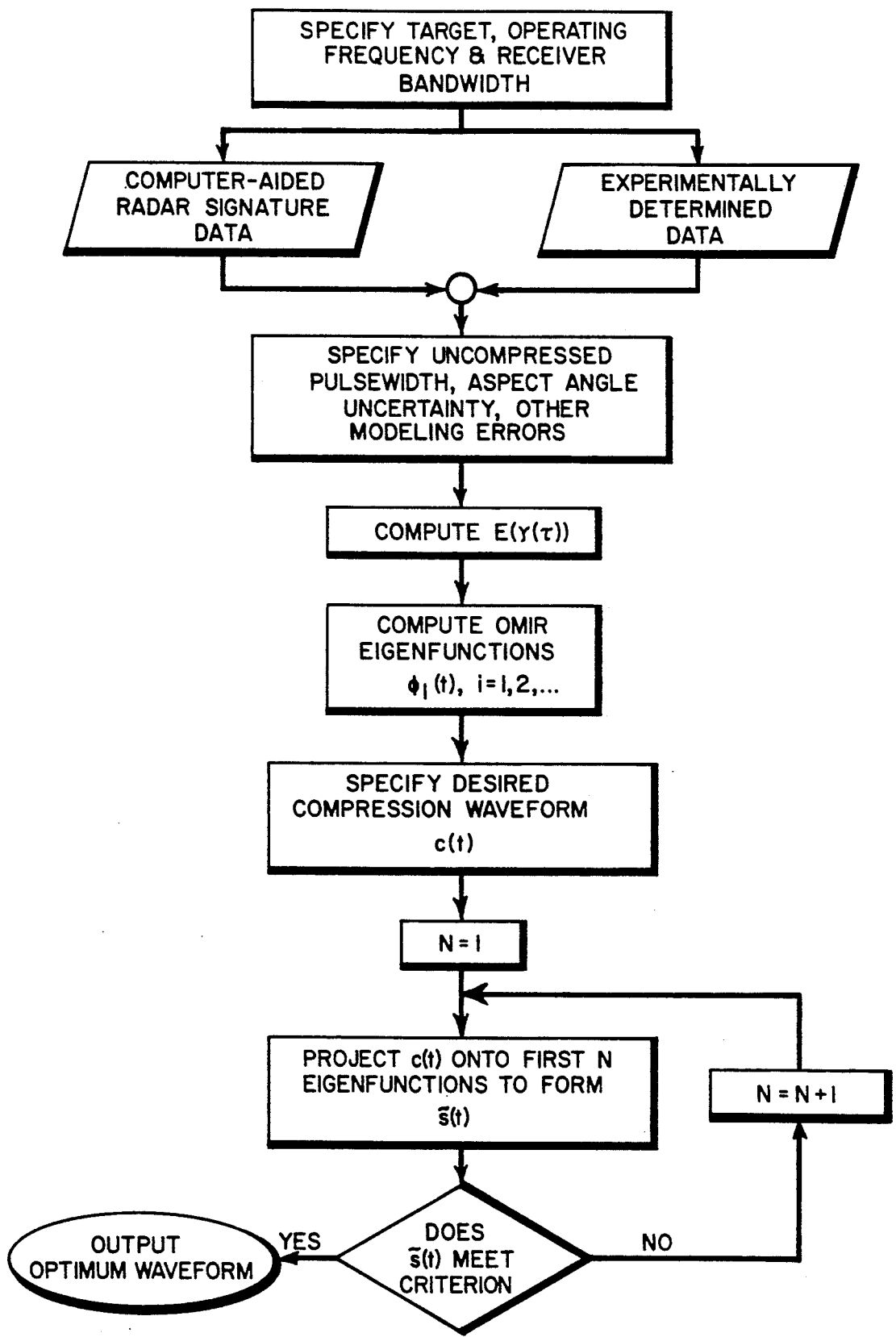
FIG. 4 is a flowchart of a modified OMIR waveform design process according to the preferred embodiment of the invention.

To alleviate this range resolution problem, N is increased and c(t) is set equal to the chirp waveform. The resulting waveform is shown in FIG. 2, where a range resolution which is essentially identical to that of the chirp waveform is achieved by an expansion index $N=10$ constrained OMIR waveform $\tilde{s}(t)$. Furthermore, as shown in FIG. 3, which gives the output signal-to-noise ratio as a function of the expansion index N, the $N=10$ waveform maintains more than half of the dB gain in output signal-to-noise ratio over the chirp waveform as does the optimum OMIR waveform shown in FIG. 1, which has a signal-to-noise ratio of about 1.7 dB.

In general, the ratio of output SNR as a function of N to the maximum output SNR (N=1) is given by $$\frac{SNR(N)}{SNR(1)} = \frac{1}{\lambda_1} \left[ \frac{|c_1|\lambda_1 + |c_2|\lambda_2 + \ldots + |c_N|\lambda_N}{|c_1| + |c_2| + \ldots + |c_N|} \right] \tag{8}$$

This formula has the property that the ith eigenvalue $\lambda_i$ is proportional to the signal-to-noise ratio associated with the ith eigenfunction $\phi_i(t)$ of the OMIR integral equation.

As shown in FIG. 5, therefore, the design process for the output optimum waveform is as follows: First, a target, an operating frequency, and a receiver bandwidth are specified. These parameters are then modeled using computer-aided radar signature data and/or experimentally determined data to determine the uncompressed pulse width, aspect angle uncertainty, and other modeling errors. Next, the autocorrelation function is determined and the OMIR eigenfunctions $\phi_i(t)$ are computed. Finally, the desired compression waveform c(t) is specified and then different values of N are tried out in accordance with equations (5) and (6) until an optimum waveform $\tilde{s}(t)$ is achieved.

It will of course be appreciated by those skilled in the art that the specific values for the various functions described above are for purposes of illustration only and are not to be taken as limiting. Instead, it is intended that the invention be limited only by the appended claims.

We claim:

1. A method for designing a pulse compression compatible modified OMIR waveform, comprising the steps of:

specifying a target, operating frequency, and receiver bandwidth;

computing an autocorrelation function for an impulse response of the specified target, operating frequency and receiver bandwidth;

computing OMIR eigenfunctions $\phi_i$, $i = 1, 2, \ldots, \infty$ for the autocorrelation function;

specifying a waveform c(t) having a desired pulse compression characteristic;

projecting c(t) onto one of said eigenfunctions to generate a waveform $s_N(t)$ which possesses the desired pulse compression characteristic.

2. A method as claimed in claim 1, wherein the autocorrelation function is given by $$\gamma(t,\tau) = \int_{T_i}^{T_f} h_1(\lambda - t) h_1^*(\lambda - \tau) d\lambda,$$

where $T_f \to T_i$ is an observation time interval, $\tau$ represents a time over which s(t) interacts with a target, and $h_1(t)$ is an impulse response of the target.

3. A method as claimed in claim 1, wherein $$\tilde{S}_N(t) = \sum_{i=1}^{N} c_i \phi_i(t)$$

and $$c_i = \int_0^T c(t) \phi_i^*(t) dt,$$

where T is the duration of waveform c(t).

4. A method as claimed in claim 3, wherein expansion index N is gradually incremented until the desired pulse compression characteristic is obtained.

5. A method as claimed in claim 1, wherein c(t) is set equal to the chirp waveform.

6. A radar system, wherein c(t) is a waveform having a desired pulse transmission characteristic and wherein a transmitted radar waveform, as a function of time t, has the form $$\tilde{S}_N(t) = \sum_{i=1}^{N} c_i \phi_i(t),$$

and $$c_i = \int_0^T c(t)\phi_i^*(t)dt$$

and wherein $\phi_i(t)$, $i = 1, 2, \ldots, \infty$, are the eigenfunctions associated with an optimum matched illumination-reception waveform integral equation having the form $$\gamma(t,\tau) = \int_{T_i}^{T_f} h_1(\lambda - t)h_1^*(\lambda - \tau)d\lambda,$$

where $h_t(t)$ is an impulse response of a target, $T_i \rightarrow T_f$ is an arbitrary observation interval, and $\tau$ represents the time over which $\tilde{s}_N(t)$ interacts with the target.

* * * * *